United States Patent
Sherry et al.

(10) Patent No.: US 8,862,550 B1
(45) Date of Patent: Oct. 14, 2014

(54) RELIABLE IN-PLACE BOOTSTRAP METADATA TRANSFORMATION IN A SHARED DATA STORE

(71) Applicants: Gavin Sherry, San Mateo, CA (US); Caleb Welton, Foster City, CA (US)

(72) Inventors: Gavin Sherry, San Mateo, CA (US); Caleb Welton, Foster City, CA (US)

(73) Assignee: EMC Corporation, Hopkinton, MA (US)

( * ) Notice: Subject to any disclaimer, the term of this patent is extended or adjusted under 35 U.S.C. 154(b) by 20 days.

(21) Appl. No.: 13/631,917

(22) Filed: Sep. 29, 2012

(51) Int. Cl.
 *G06F 17/30* (2006.01)
(52) U.S. Cl.
 USPC .......................................... 707/647; 707/638
(58) Field of Classification Search
 CPC ................................. G06F 17/30309
 USPC ................................................. 707/647, 638
 See application file for complete search history.

(56) References Cited

U.S. PATENT DOCUMENTS

| 2013/0007219 A1* | 1/2013 | Sorenson et al. ............. 709/219 |
| 2013/0097655 A1* | 4/2013 | Vaidyanathan et al. .......... 726/1 |

* cited by examiner

*Primary Examiner* — Etienne LeRoux
*Assistant Examiner* — Cindy Nguyen
(74) *Attorney, Agent, or Firm* — Barry N. Young

(57) ABSTRACT

A method for upgrading software in a shared data store comprises a reliable, safe in-place method of transformation of metadata in which a metadata catalog is cloned, stored in the data store, and the cloned metadata is transformed in-place using the data store engine and SQL declarative language. The original and transformed cloned catalog files are swapped atomically, and the system upgrade is validated using the new version of software. If errors are encountered during the upgrade, the original catalog can be swapped back and the system returned to its original state.

20 Claims, 4 Drawing Sheets

RELIABLE IN-PLACE BOOTSTRAP METADATA TRANSFORMATION IN A SHARED DATA STORE

BACKGROUND

This invention relates generally to database upgrades, and more particularly to methods for reliably transforming system metadata in a massively parallel shared data store.

Software upgrades from one version of software to another are performed periodically in database systems. It is common in upgrades that internal structures are changed from one software release to another to expose new functionality. This means that the internal structures must be transformed from one state to a new state. Since the internal structures are established by system metadata, this involves transforming the system metadata. Metadata is critical to the function of a shared data store. It characterizes the logic structure of the underlying user data, and determines the system behavior, which can be changed by altering the metadata. System metadata is stored at each system node in a catalog. Bootstrap metadata is that metadata which is needed at certain times, such as at system start, stop and reconfiguration. It provides a list of elements such as internal tables that are necessary for starting, stopping the system or for transitioning states. The bootstrap metadata of a shared data store may change from one software release to another. In order to upgrade from one release to another, a user must upgrade the shared data store. The problem is how to accomplish this reliably.

For shared data stores hosting relatively small amounts of data, such as many transaction processing systems, the most practical and reliable way to upgrade the software is to extract the data from the data store, store it in an intermediate format, and then reload it into the shared data store using the new release of the software. However, for large massively parallel shared data stores which may store an extremely large amount of data, such as a petabyte (1000 terabytes) or more of data, distributed across a cluster of processing nodes, this is impractical because an amount of data this large cannot be extracted to any particular point in intermediate form. Even if it could, the time to do so would be prohibitive. Accordingly, it is necessary to upgrade the data in place on disk.

Some database vendors provide a low level program as a software upgrade tool to update the data in place. However, this approach is extremely error-prone. If there is a bug in the upgrade tool, or if there's an unexpected event in the upgrade process, the system may be left stuck in an indeterminate state midway in the upgrade process without any way of going back to the original configuration or going forward to the upgraded configuration. Essentially, the system is corrupted at this point.

There's a need for an upgrade process that addresses the foregoing problems and other known problems by providing a reliable and secure in-place bootstrap metadata transformation process in a parallel shared data store that allows users to easily upgrade to new software releases. It is to these ends that the present invention is directed.

DESCRIPTION OF PREFERRED EMBODIMENTS

While the invention may be employed with different types of database systems, it is particularly well adapted to a massively parallel distributed shared data store architecture, and will be described in that context. However, as will be appreciated, this is illustrative of only one utility of the invention.

Figure 1:
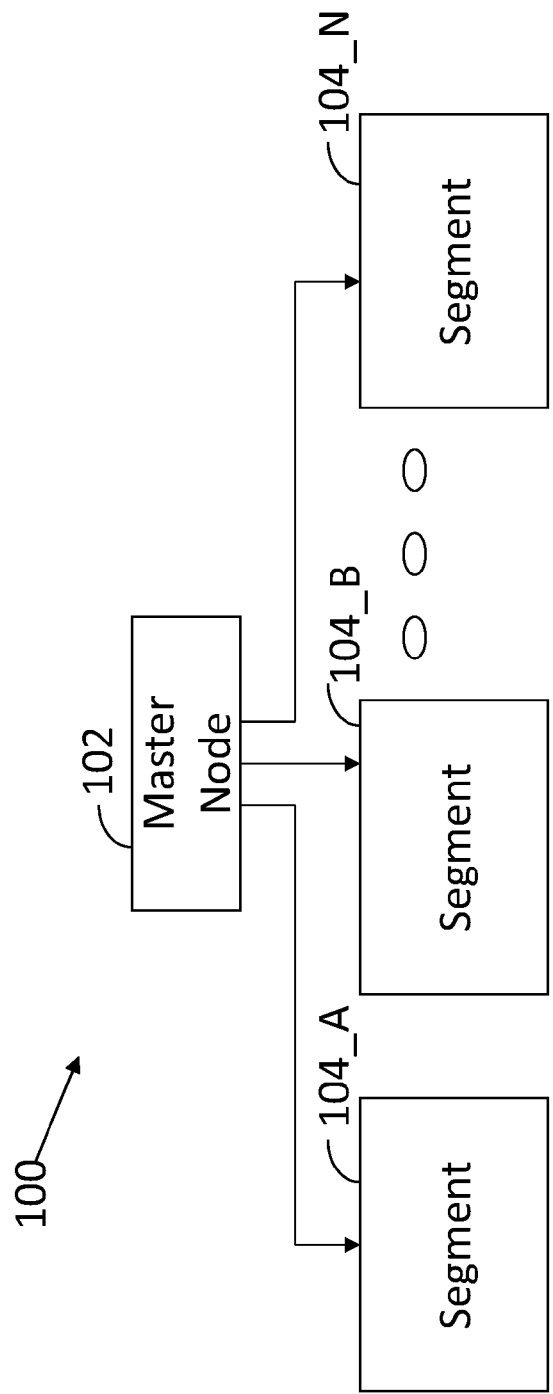
FIG. 1 is a block diagram of one type of distributed database system with which the invention may be employed.

FIG. 1 illustrates the architecture of a distributed shared-nothing data store system 100 of the type with which the invention may be employed. The system may comprise a cluster of distributed processing nodes that include a master node 102 which connects to a plurality of segment nodes 104_A through 104_N. The master and segment nodes may comprise generally similar server applications having the same process model as a standalone server that is augmented with extensions for use in a distributed system, such as data distribution, remote process communications, and data retention.

Figure 2:
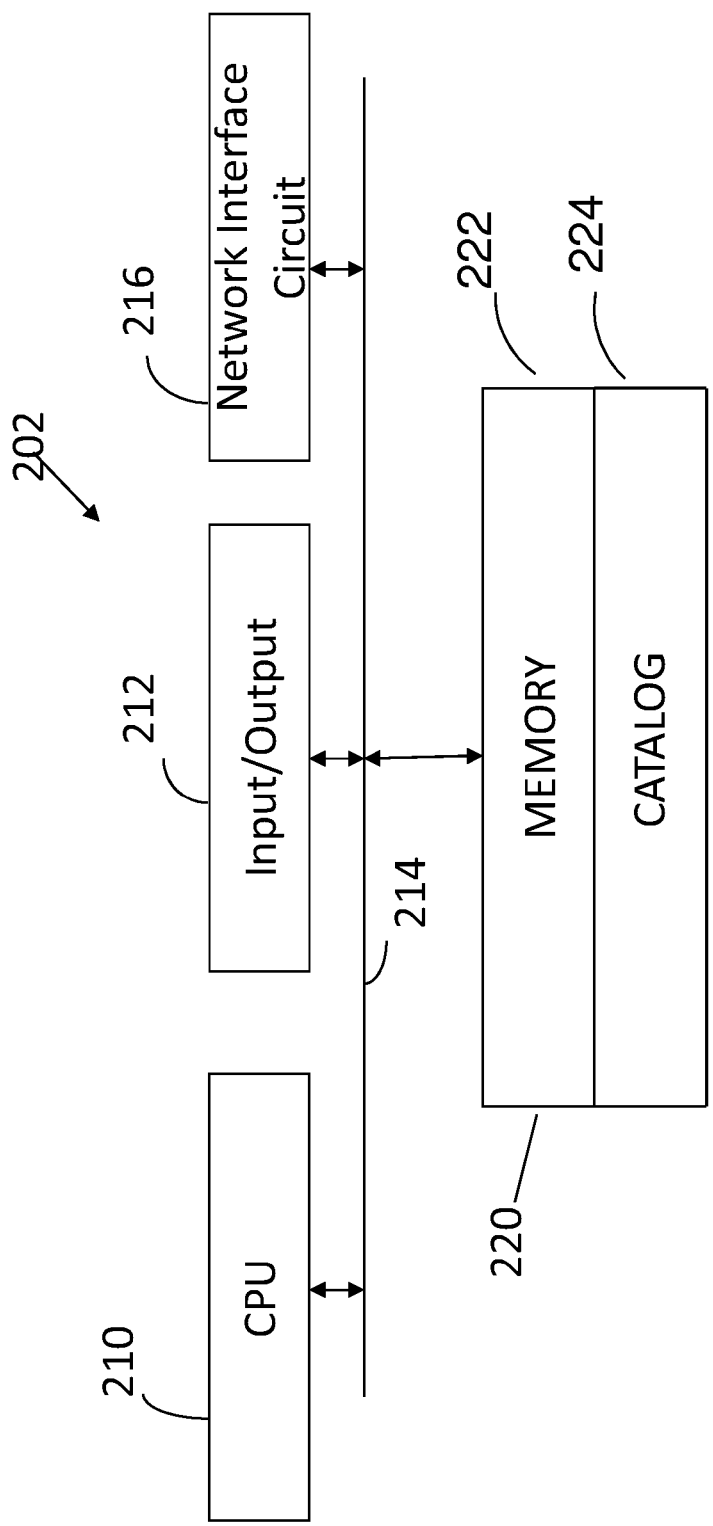
FIG. 2 is a block diagram illustrating a node of the database system of FIG. 1.

FIG. 2 illustrates an example of the architecture of a master node 202 of the database system that is configured to perform processes and operations in accordance with the invention. The master node and the segment nodes may have substantially the same architectures. The master node 202 may comprise a host computer server system 210 (which may comprise a single CPU or may be a multi-processor system comprising a plurality of CPUs) connected to input/output (I/O) devices 212 by a bus 214. The I/O devices may be standard computer system input and output devices. A network interface circuit 216 may also be connected to bus 214 to allow the master node to operate in the networked environment of the database of FIG. 1. The master node may further have storage 220 comprising non-transitory physical storage media connected to the bus that stores data and embodies executable instructions to control the operations of the computer system. Storage 220 may include a main memory 222 comprising instructions that control the CPU to operate in accordance with the invention, as will be described, and may contain other storage 224, such as a database for storing data and, among other things, a catalog. The catalog in a database, as is well known, stores metadata describing the structure and logical attributes of database objects, serves as an index to the actual database user data, and stores tables of users and privileges that are used for controlling access to the database and permissible actions.

Metadata characterizes the logic and defines the shape of the underlying user data in a database. Distributed databases (data stores) of the type to which the invention pertains have large repositories of metadata and a plethora of objects which the databases manage. The databases are metadata driven. They are self-configuring and the behavior the database system can be changed by altering the metadata. Metadata also includes bootstrap metadata. Bootstrap metadata is embedded in the software, and provides data elements that are used to get the system started and running before the catalog is available. The database system itself provides logical containers for user data. Within the database, there are name spaces, tables which afford a two-dimensional representation of data in columns and rows, indexes into the data, and stored programs which can be used to access data. The database contains many objects, both logical and physical. In order to make such objects accessible, usable or to enforce constraints that may apply to them, information about the objects is represented in metadata which is stored in the metadata catalog. Accordingly, a software upgrade process comprises transforming the metadata catalog from a first representation A to a second representation B, where representation B is the representation corresponding to the upgraded version (V.2) of the system. Metadata includes both bootstrap and non-bootstrap metadata which are handled the same way. Each segment of the shared data store has a catalog which in an exact replica of the catalogs on the other segments. Thus, the metadata in the catalog on each segment must be transformed as part of the upgrade process. As described above, the challenge in traditional databases is in being able to perform an upgrade reliably, quickly and safely.

As will be described in more detail, the invention provides an in-place metadata transformation process for upgrading a database that is safe and reliable. At the end of the process, the system ends up in only one of two possible states, i.e., an upgraded state B running on an upgraded version V.2 of the software, or in the original state A running on the original version V.1 of the software. Thus, even if a failure is countered during the upgrade, the system is not corrupted or left in an indeterminate or undefined state. Rather, it is left in the original unchanged state.

In accordance with the invention, the upgrade process uses the data store engine itself to perform the upgrade. The benefits of this are that the data store system is high performance, has full tolerant fail-safe mechanisms, and the data store engine used for the upgrade has been well-exercised and tested. Therefore, it is unlikely to fail. Furthermore, the upgrade process modifies only the metadata, not the actual user data, and the modifications are made only to a duplicate clone or shadow copy of the metadata rather than to the real original metadata. Because the metadata is considerably smaller by six or seven orders of magnitude than the user data, it can be readily duplicated and stored as a shadow copy on disk within the data store. Then, after the upgrade process has been completed on the shadow copy of the metadata the shadow copy and the real metadata are swapped. The system is then run and validated with the transformed metadata and the new version V.2 the software. If any problems occur the real metadata can be swapped back. Since the user data was not changed, this will restore the system to its original state.

Figure 3:
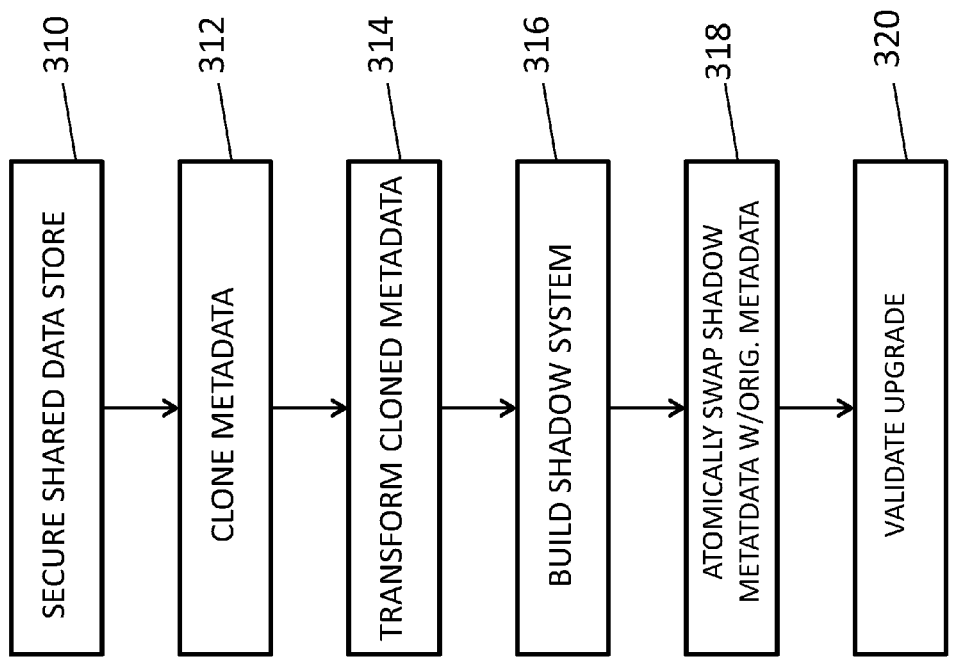
FIG. 3 is a block diagram giving an overview of an in-place upgrade process in accordance with the invention.

FIG. 3 is a flowchart that illustrates an overview of an in-place upgrade process in accordance with the invention. The process is performed in parallel on all segments. Beginning at 310, the shared data store system is secured so that only the transformation (upgrade) process can access the data store. We do not want any other user processes to change the data store during an upgrade, because we want the transformation from state A to state B to be an atomic process. Next, at 312, the shared data store itself is used to clone (copy) the metadata (including the bootstrap metadata). This duplicates the catalogs within the engine as user data catalog tables, which can be easily modified as desired. At 314, the data store engine is used to make the necessary transformations to the cloned metadata. The transformations may involve, for example, adding a new column of data to a table. By using the data store engine, the transformation process of the invention is able to use the declarative language, e.g., SQL language, of the engine to read the underlying data, change or insert a new column into the table, etc., and save it as a temporary table devised as part of the upgrade process. As part of the transformation process, the location of the temporary table and the metadata are registered.

At 316 a shadow system is built. The shadow system comprises the transformed clone of the metadata including the bootstrap metadata of the shared data store. The transformation process updates the metadata relating to the upgrade changes as required using the declarative language, and traces the dependency tree back through the system using the engine so that all of the related dependencies can be updated also. The upgrade process duplicates the entire catalog. The underlying files on disk which have been modified are registered. Thus, each node will have two directories. One will be the original authoritative system state A and the other will be the new upgraded system state B. All changes are made to the duplicate cloned metadata, not to the authoritative version, so in the event of an error the process can roll back. This is a significant safety advantage.

At 318, the shadow metadata and the original authoritative metadata files are atomically swapped by switching the files on disk. The system cannot be running, even in the limited state, for this. The system is then brought back up in a maintenance mode using the new software version, and the upgrade is validated at 320. Since each step is atomic and takes place on the cloned shadow data, the shared data store is left unaffected. If any step in the upgrade process fails, the upgrade fails and can be rolled back. Also, since the upgrade process is performed in parallel on all segments across the cluster, if it fails on any segment the engine will detect the failure and roll back the entire cluster to the original state.

Figure 4:
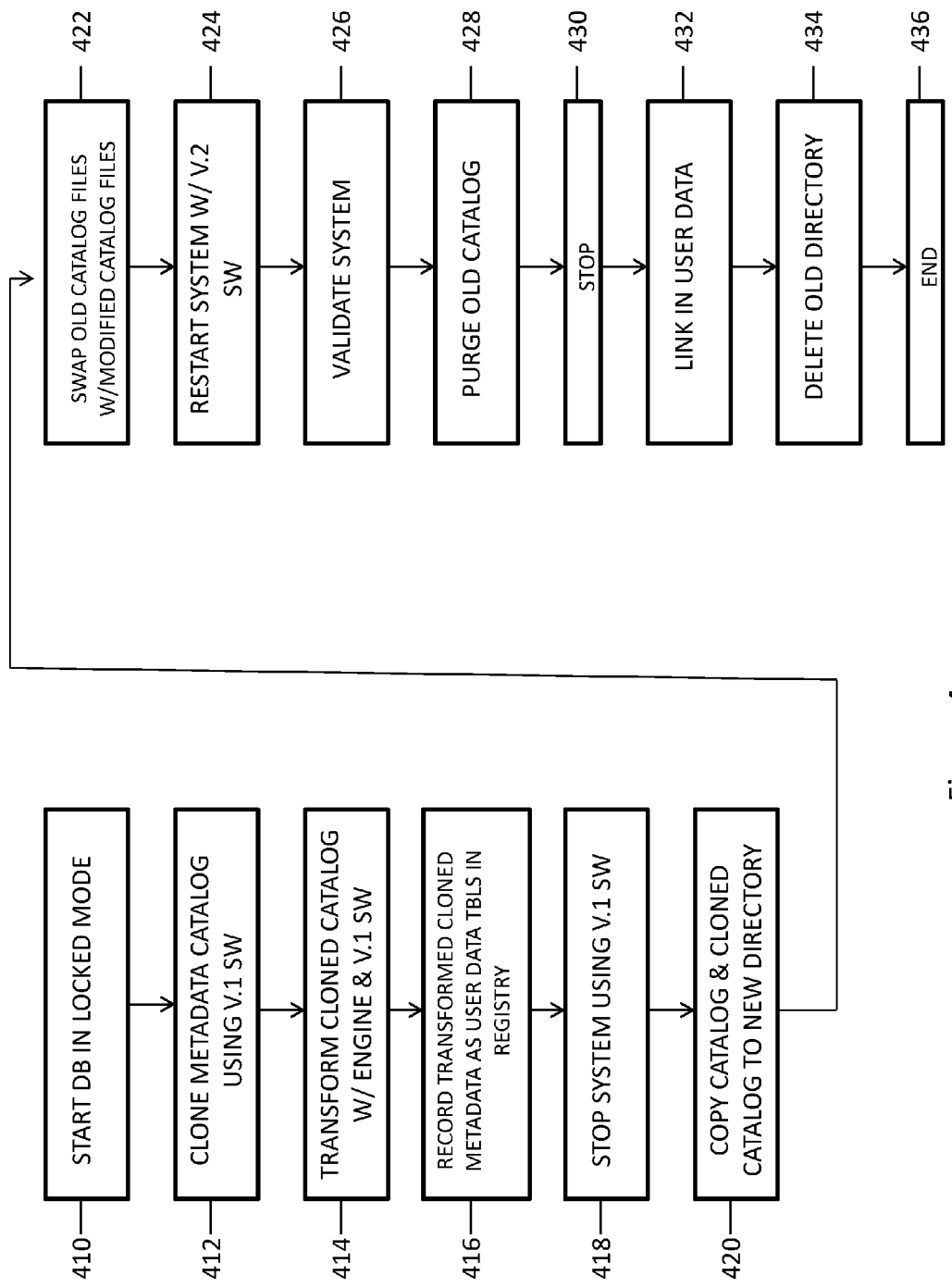
FIG. 4 is a more detailed block diagram of an upgrade process in accordance with a preferred embodiment of the invention.

FIG. 4 illustrates a preferred embodiment of an upgrade process in accordance with the invention in more detail than shown in FIG. 3. The process begins at 410 with the database (data store) starting in a locked mode, as explained in connection with FIG. 3, step 310, to prevent any user changes during the upgrade. At 412, the engine duplicates the catalog using the current version V.1 of the software. This provides a clone of the metadata and the bootstrap metadata as explained in connection with 312, FIG. 3. At 414, the cloned catalog is transformed (modified) as required for the upgrade using the data store engine, its declarative language, e.g., SQL, and the current version V.1 of the software. The transformed cloned catalog is then recorded in the registry as user data tables at 416. The system is stopped using the V.1 software at 418, and the original system catalog and the cloned catalog are copied to a new directory at 420 using the metadata in the system.

At 422, the original catalog files and the modified catalog files are swapped, while retaining the copy of the original catalog files. At 424, the system is restarted using the upgraded version V.2 of the software and the modified metadata, and at 426, the upgraded system is validated. If the validation is successful, the old original catalog data may be purged at 428, and the process stopped at 430. The upgrade process links in the user data at 432, deletes the old original directory at 434, and ends at 436 to complete the upgrade process.

As explained above, at any point in the upgrade process if an error is encountered, the invention advantageously enables the system to revert back to its original representation which is in the original directory. If the validation is successful and there are no errors, the original directory may be deleted. At this point, the system will operate with the new upgraded version V.2 of the software.

Important aspects of the invention, as explained above in the foregoing description, are that the system itself makes a clone of the metadata catalog using the system engine and original software, and applies in-place upgrade transformations to the cloned copy of the catalog in the same manner as changes to user data using the declarative language of the engine. The upgrade is safe, scalable, predictable and reliable. If an error is encountered during the upgrade, the system can be rolled back to its original unchanged state and not left corrupted or in some intermediate indeterminate state. Moreover, the same upgrade process is applied to both bootstrap and non-bootstrap metadata. Bootstrap metadata typically does not change very much, and upgrades traditionally have comprised simply hanging new tables onto the old bootstrap metadata, and indicating that the old tables in the changed bootstrap metadata should be ignored. This caused the bootstrap metadata to grow uncontrollably, and presented problems to both users and maintenance personnel. The invention, in contrast, upgrades the bootstrap metadata reliably and safely together with and in the same way as non-bootstrap metadata, so that the bootstrap metadata can be maintained in a predictable and up-to-date state.

While the foregoing has been with respect to preferred embodiments of the invention, it will be appreciated by those skilled in the art that changes to these embodiments may be made without departing from the principles and spirit of the invention, the scope of which is defined by the appended claims.

The invention claimed is:

1. A computer-implemented method of in-place metadata transformation for a system software upgrade from an original software version to an upgraded software version in a massively parallel shared data store system, comprising:
    cloning original system metadata to provide a copy of cloned metadata within the system;
    transforming the copy of cloned metadata in place within the system using the original software version to produce transformed metadata by applying software upgrade related changes to the copy of cloned metadata as required by the upgraded software version;
    updating using the original software version system dependencies that are changed by said transformed metadata;
    building a shadow system comprising the transformed metadata and related system dependencies changed by said transformed metadata;
    atomically swapping the transformed metadata and the original system metadata to provide an upgraded system; and
    validating the upgraded system by running the upgraded system using the upgraded software version.

2. The method of claim 1, wherein said cloning original system metadata comprises duplicating an original metadata catalog.

3. The method of claim 2, wherein building a shadow system comprises copying said original metadata catalog to a first directory and an upgraded catalog of transformed metadata to a second directory in said system.

4. The method of claim 3, wherein said atomically swapping comprises swapping original metadata catalog files and upgraded catalog files, and wherein said validating comprises running the system with the upgraded software version using said upgraded catalog files to verify correct system operation.

5. The method of claim 4 further comprising, upon validating the upgraded system, purging said original metadata catalog and deleting said first directory containing said original system metadata.

6. The method of claim 4 further comprising upon encountering errors during said validating rolling back the system state to an original state that uses said original metadata catalog and original system software.

7. The method of claim 1, wherein said transforming the cloned metadata comprises changing the cloned metadata using a database engine and associated declarative language of said data store system.

8. The method of claim 1, wherein said transforming the cloned metadata comprises changing said cloned metadata in a catalog using said original software version of system software.

9. The method of claim 1 further comprising locking the data store system to prevent user access during said method.

10. The method of claim 1, wherein said metadata comprises bootstrap metadata and non-bootstrap metadata.

11. The method of claim 1, wherein said massively parallel shared data store system comprises a cluster of a plurality of segments, each segment having a portion of said data store system comprising a database engine and an associated database, and wherein said method is performed in parallel on each segment.

12. Computer readable non-transitory storage medium product embodying instructions for controlling the operation of a computer for in-place metadata transformation for a system software upgrade from an original software version to an upgraded software version in a shared data store system, comprising instructions for:
    cloning original system metadata to provide a copy of cloned metadata within the system;
    transforming the copy of cloned metadata in place within the system using the original software version to produce transformed metadata by applying software upgrade related changes to the copy of the cloned metadata as required by the upgraded software version;
    updating using the original software version system dependencies that are changed by said transformed metadata;
    building a shadow system comprising the transformed metadata and related system dependencies changed by said transformed metadata;
    atomically swapping the transformed metadata and the original system metadata to provide an upgraded system; and
    validating the upgraded system by running the upgraded system using the upgraded software version.

13. The computer readable product of claim 12, wherein said cloning original system metadata comprises duplicating an original metadata catalog.

14. The computer readable product of claim 13, wherein said building a shadow system comprises copying said original metadata catalog to a first directory and an upgraded catalog of transformed metadata to a second directory in said system.

15. The computer readable product of claim 14, wherein said atomically swapping comprises swapping original metadata catalog files and upgraded catalog files, and wherein said validating comprises running the system with the upgraded software version using said upgraded catalog to verify correct system operation.

16. The computer readable product of claim 15 further comprising, upon validating the upgraded system, purging said original metadata catalog and deleting said first directory containing said original system metadata.

17. The computer readable product of claim 15 further comprising upon encountering errors during said validating rolling back the system state to an original state that uses said original metadata catalog and original system software.

18. The computer readable product of claim 12, wherein said transforming said cloned metadata comprises instructions for changing the cloned metadata using a database engine and associated declarative language of said data store system.

19. The computer readable product of claim 12, wherein transforming said cloned metadata comprises instructions for changing said cloned metadata in a catalog using said original software version of system software.

20. The computer readable product of claim 12 further comprising instructions for locking the data store system to prevent user access during said metadata transformation.

\* \* \* \* \*